Nov. 15, 1927.
M. GLOWACKI
1,649,296
ADJUSTABLE PROPELLER FOR AEROPLANES
Filed March 24, 1927
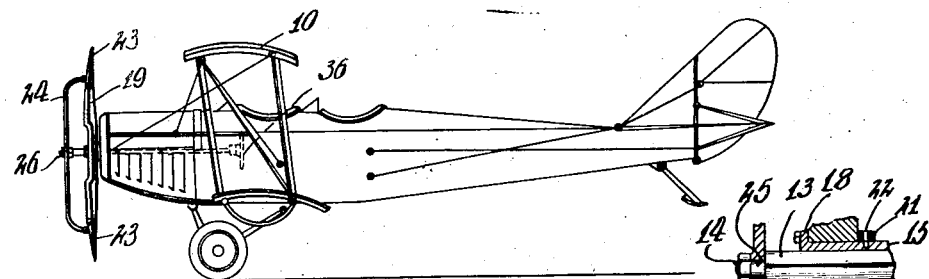
Fig. 1.
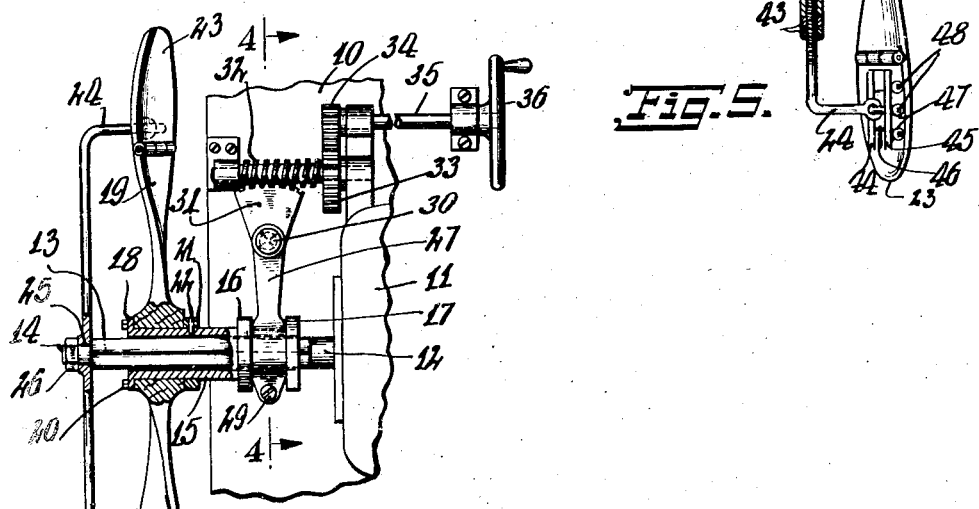
Fig. 2.
Fig. 5.
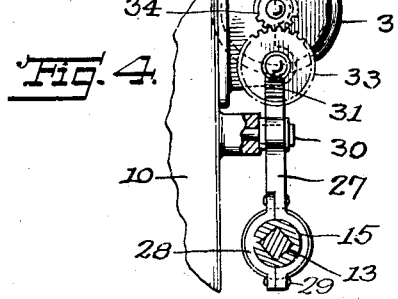
Fig. 4.
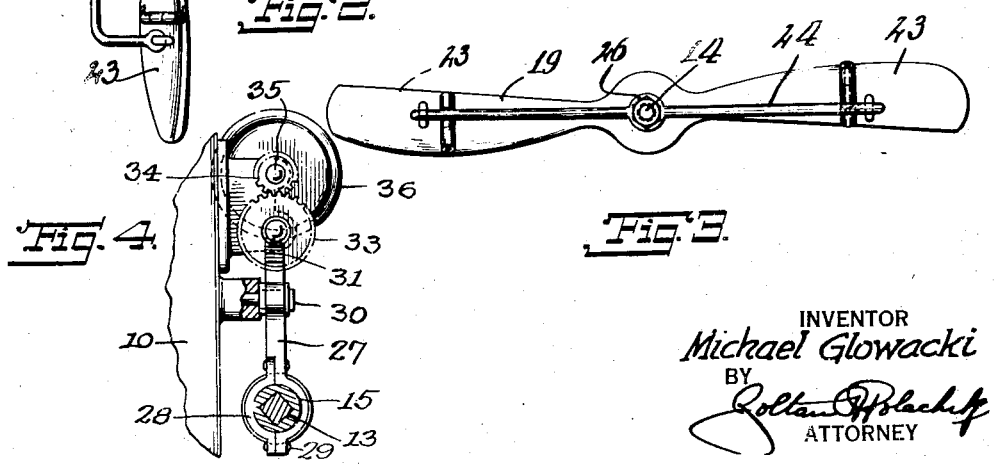
Fig. 3.
INVENTOR
Michael Glowacki
BY
ATTORNEY Patented Nov. 15, 1927.

1,649,296

UNITED STATES PATENT OFFICE.

MICHAEL GLOWACKI, OF SHENANDOAH, PENNSYLVANIA.

ADJUSTABLE PROPELLER FOR AEROPLANES.

Application filed March 24, 1927. Serial No. 177,953.

This invention relates generally to propellers, and has more particular reference to an adjustable propeller for aeroplanes.

The invention has for an object the provision of an improved adjustable propeller which will operate efficiently, and which can be manufactured and sold at a low cost.

For further comprehension of the invention, and of the objects and advantages thereof, reference will be had to the following description and accompanying drawing, and to the appended claim in which the various novel features of the invention are more particularly set forth.

Referring to the drawing forming a material part of this disclosure:

Fig. 1 is a side elevational view of an aeroplane equipped with the invention device.

Fig. 2 is an enlarged fragmentary partly sectional view of the front portion of the aeroplane shown in Fig. 1.

Fig. 3 is a front view of the propeller portion of the aeroplane.

Fig. 4 is a transverse sectional view taken on the line 4—4 of Fig. 2.

Fig. 5 is a fragmentary view similar to Fig. 2, but of a modified form.

The reference numeral 10 indicates generally an aeroplane, equipped with a suitable motor 11, having a round shaft 12 formed with a square end 13, and a small threaded portion 14. Slidably mounted on the portion 13 is a collar 15 formed at one end with flanges 16, 17, and at the other end with a flange 18. A propeller body 19 is rigidly fixed to the collar 15 by screws 20, and another collar 21 is fixed to the collar 15 by means of a pin 22, and abuts the propeller body 19 against the flange 18. Hingedly connected to the propeller body 19 are wing portions 23 having engaged thereto the ends of a connecting member 24 formed intermediate of its ends with an aperture 25 engaged over the threaded portion 14 and held in position by a nut 26 threadedly engaging the threaded portion 14.

Engaged between the flanges 16, 17 is one end of an arm 27 having a semicircular member 28 connected thereto by screws 29 so that the collar 15 is rotatable in the end of the arm. The arm is pivoted intermediate of its ends as at 30, and the other end of the arm is formed with a gear segment 31, which meshes with a worm 32 pivotally mounted, and having rigidly connected thereto a gear 33. Another gear 34 meshes with the gear 33, and is fixed to a shaft 35 pivotally supported, and having at one end a hand wheel 36.

As the motor 11 runs the shaft 12, 13 rotates, carrying along the collar 15, the propeller body 19, wing portions 23, and the connecting member 24. Upon the manual manipulation of the handle 36, the worm 32 may be rotated moving the segment 31, of the arm 27, which moves the collar 15 relative to the shaft 12, thereby changing the angle of the wing portions 23 relative to the propeller body 19, which affects the power developed by the rotating propeller.

In the modification shown in Fig. 5, the connecting member 24 is split on each side of its center, as indicated by 24', but is adjustably and rigidly joined by a coupling 40 formed with right and left hand threads 41, 42 respectively, threadedly engaging the ends of the split 24'. Locking nuts 43 serve to lock the split 24' in adjusted position. The wing portions 23 are provided with a a pair of parallel guides 44, 45, between which a slide 46 is engaged, and the end of connecting member 24 is attached to this slide. Cam elements 47 are pivoted to the wing portion 23, and have top square portions 48 for the engagement of a turning tool. The guide 45 is constructed for somewhat flexible material, and the cams 47 are positioned adjacent this guide so that upon the proper manipulation of the cams, the guide is forced against the slide 46, locking the slide in certain adjusted positions. The distance from the slide 46 to the hinge between the wing portion 23 and the propeller body 19, determines the rate of change of the position of the wing portions 23 for a given movement of the collar 15.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claim.

Having thus described my invention, what I claim as new and desire to secure by United States Letters Patent is:—

An adjustable propeller for aeroplanes or the like, comprising a propeller body, wing portions hinged thereto, a collar attached to the propeller body, a shaft within the collar, the collar being slidable on the shaft, a connecting member fastened intermediate of its ends to the shaft, means for adjusting the distance between the point of connection of the connecting members to the wing portions and the hinge between the wing portions and the said propeller body, said means comprising a pair of parallel guides fixed to the wing portions, a slide between said guides, cam elements pivoted adjacent one of said guides, capable upon proper manipulation to press the guide against the said slide locking the slide, the ends of the said connecting member being attached to said slides, and means for adjusting the length of said connecting member.

In testimony whereof I have affixed my signature.

MICHAEL GLOWACKI.